Patented May 1, 1951

2,551,003

UNITED STATES PATENT OFFICE 2,551,003

PRODUCTION OF AZO COMPOUNDS

Herbert H. Johnson, Jr., Woodbury, N. J., assignor to E. I. du Pont de Nemours & Company, Wilmington, Del., a corporation of Delaware No Drawing. Application February 13, 1947, Serial No. 728,379

4 Claims. (Cl. 260—205)

This invention relates to a novel and simplified method for the manufacture of azocompounds, and more particularly to the preparation of azobenzene.

Azobenzene is a compound of considerable importance, having practical application as an organic chemical intermediate and as an insecticide. It has been prepared by various methods of the prior art in one or more steps, for example by the reduction of nitrobenzene by zinc dust and alcoholic potash, by electrolytic reduction methods, by catalytic hydrogenation, etc. While the known methods are capable of producing the desired compound, they are all characterized by some disadvantage, such as low yields, complicated operation, the requirement of relatively-expensive or difficultly-obtainable reactants, and the like.

An object of the present invention is a new and improved method for the manufacture of azocompounds from mononitroaromatic compounds, offering definite advantages over the methods of the prior art. A further object is such a method of simplified procedure, giving excellent yields and requiring the use of no difficultly-obtainable reactants. A still further object is an economically-desirable process for the manufacture of azobenzene. Additional objects will be disclosed as the method is described at greater length in the following.

I have found that the foregoing objects are accomplished and definite advantages obtained over methods previously used, when I cause to react at an elevated temperature a mononitro compound of the group consisting of the aromatic hydrocarbons and their substitution products with a water-soluble alkali hydroxide and a lower aliphatic monohydric alcohol, and maintain the reactants under pressure substantially greater than atmospheric. While the process of the invention is applicable to a variety of aromatic nitrohydrocarbons and their derivatives, the manufacture of azobenzene from nitrobenzene is particularly the objective because of the industrial importance of this chemical compound. In carrying out the process for this material, a temperature in excess of 100° C. is maintained during the reaction, which is carried out in a closed vessel; hence, superatmospheric pressure conditions prevail, for example between 50 and 200 pounds per square inch.

The following examples are given by way of illustration only but will serve as specific embodiments of procedure followed in carrying out the invention.

Example 1

Into a 350 cc. steam-jacketed autoclave was charged 60 grams of nitrobenzene, 22.5 grams of reagent grade sodium hydroxide, and 72 grams of methanol. The autoclave was closed, agitated, and heated by means of steam in the jacket. At around 100° C. during careful heating, the internal temperature rose rapidly to 135–150° C., and an internal pressure of 75–100 pounds per square inch (gage) was indicated. When the temperature and pressure began to fall, heating was resumed and the temperature and pressure increased to around 160° C. and 175 pounds per square inch respectively. Heating was continued for three hours to complete the reduction to azobenzene. The reaction mixture was then cooled, the autoclave was vented, and its contents washed out. The product and wash waters were cooled; filtered; washed, first with cold water, then in the molten state with hot water; and dried. The product amounted to 38–40 grams of blood-red crystals, indicating an 85–90% yield, the material having a freezing point of 63–64.5° C.

Example 2

A solution was prepared of 100 grams of sodium hydroxide in 350 grams of methanol, and this solution was introduced into a jacketed autoclave where the temperature was raised to around 130–135° C. Nitrobenzene in the amount of 200 grams was fed in slowly over a period of 70 minutes, the temperature rising gradually to around 170° C., while the pressure increased to about 175 pounds per square inch. The reaction mixture was digested for 90 minutes at 165–170° C. and was then cooled. The azobenzene was crystallized out and the crystals filtered and water-washed. Purified azobenzene in the amount of 125 grams was obtained, representing a yield of about 85%, the material having a freezing point of 67° C.

Example 3

Following the same general procedure, a solution of around three pounds of sodium hydroxide in 12.5 pounds of methanol was fed into an autoclave, and the temperature was raised to 135° C. Nitrobenzene in the amount of eight pounds was added gradually over a period of 45 minutes, the temperature rising to 160–165° C. The mixture was heated for two hours at this temperature, the pressure being approximately the same as in Example 2. The azobenzene was recovered as before, and a yield of 92.5% was obtained of material of a freezing point of 65.1° C.

Example 4

A solution was prepared of 35 grams of sodium hydroxide in 75 cc. of methanol, 40 grams of p-nitrobenzoic acid was added, and this mixture was charged into a pressure vessel. The vessel was closed and heated by means of steam in a surrounding jacket, agitation being provided. A temperature of about 160° C. was maintained for a period of three hours. The contents of the autoclave were then washed out with water and acidified with dilute sulfuric acid. The insoluble acid material was filtered off and dried, and the dried material was boiled with acetone to remove the unreacted p-nitrobenzoic acid. The material was water-washed and dried, leaving 18 grams of p,p'-azobenzoic acid, otherwise known as p-p'-dicarboxyazobenzene. This constituted a conversion of around 61%, but a considerably higher yield, in view of the recovered p-nitrobenzoic acid. The material had a decomposition point of around 350° C.

The reaction involved in the reduction of nitrobenzene to azobenzene may be written as follows:

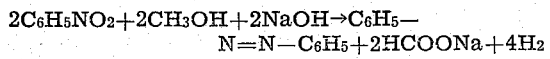

$$2C_6H_5NO_2 + 2CH_3OH + 2NaOH \rightarrow C_6H_5-N=N-C_6H_5 + 2HCOONa + 4H_2$$

Generally speaking, a slight excess of caustic over that required in the equation is desirable, for example around 110–115% of the calculated amount. A considerable excess of methanol is advantageous, and any final excess can be readily recovered in obtaining the product. While the examples have shown the use of sodium hydroxide, which is highly satisfactory from both operating and economic viewpoints, other water-soluble alkali hydroxides are applicable, notably potassium hydroxide. Likewise, in place of methanol, I may employ ethanol or propanol. The aliphatic monohydric alcohols containing more than three carbon atoms are less readily reactive, hence less desirable for use.

In carrying out the process for azobenzene, elevated temperatures are maintained throughout the reaction, and a temperature in excess of 100° C. is advisable in order to assure completion of the desired reaction. A temperature of 160–165° C. will be sufficiently high ordinarily, but a temperature sufficiently high to break down the product should be avoided. The reaction is carried out at a pressure greater than atmospheric, and this condition will be dependent mainly on the vapor pressure of the methanol or other alcohol used.

The examples have cited mainly the manufacture of azobenzene from nitrobenzene as a particularly important embodiment of the invention, because of the industrial prominence of azobenzene. The invention has broader applications, however, and may be used generally for the preparation of the corresponding azo-compounds by the reduction of mononitro compounds of aromatic hydrocarbons and their substitution products; that is, compounds in which at least one hydrogen atom attached to a carbon atom in the nucleus has been replaced by another radical. As examples of operable processes, I may cite, in addition to the manufacture of azobenzene from nitrobenzene, the preparation of any of the dimethylazobenzenes or azotoluenes from the corresponding mononitrotoluene, tetramethylazobenzenes or azoxylenes from nitroxylenes, p,p'-azobenzoic acid from p-nitrobenzoic acid, p,p'-azoanisol from p-nitroanisol, p,p'-azophenetol from p-nitrophenetol, p,p'-azodiphenyl from p-nitrodiphenyl, 2,2'-azonaphthalene from 2-nitronahthalene, and many others.

The invention of the present disclosure has practical advantages over processes heretofore in use. The method described is characterized by simplicity of operation and gives excellent yields. It has the important advantage over methods commonly used in which zinc dust or tin are required, in that such reactants can be dispensed with, an important factor at a time when they are relatively expensive and difficulty obtainable. The advantages over other methods will be apparent.

Having disclosed the invention with adequate clarity, it will be understood that many variations in details of procedure, conditions, and materials involved may be employed without departure from the scope of the invention. I intend to be limited, therefore, only by the following claims:

I claim:

1. A process for the manufacture of azo compounds from nitro compounds of the benzene series which comprises reacting in the absence of metallic reducing agents and at a temperature in excess of 100° C., a mononitro compound selected from the group consisting of the hydrocarbons of the benzene series and their ring-substituted carboxyl derivatives, with a water-soluble alkali hydroxide and a primary aliphatic monohydric alcohol containing not more than three carbon atoms, maintaining the reactants under a pressure greater than atmospheric, thereby producing the azo compound corresponding to the nitro compound treated.

2. A process for the manufacture of azobenzene, which comprises reacting nitrobenzene in the absence of metallic reducing agents at a temperature in excess of 100° C. and at a pressure greater than 50 lb./sq. in. with a water-soluble alkali hydroxide and a primary aliphatic monohydric alcohol containing not more than three carbon atoms, and separating the azobenzene from the reaction mixture.

3. The process of claim 2 in which nitrobenzene is reacted with sodium hydroxide and methanol.

4. A one-step process for the manufacture of azobenzene, which comprises reacting nitrobenzene with sodium hydroxide and methanol, carrying out the reaction at a temperature in excess of 100° C. and under a pressure greater than 50 lb./sq. in. and in the absence of metallic reducing agents, and separating azobenzene from the reaction mixture.

HERBERT H. JOHNSON, Jr.

REFERENCES CITED

The following references are of record in the file of this patent:

UNITED STATES PATENTS

| Number | Name | Date |
|---|---|---|
| 1,451,489 | Brown et al. | Apr. 10, 1923 |
| 2,014,522 | Dahlen et al. | Sept. 17, 1935 |
| 2,175,244 | Bowlus et al. | Oct. 10, 1939 |
| 2,233,129 | Henke et al. | Feb. 25, 1941 |
| 2,233,130 | Henke et al. | Feb. 25, 1941 |
| 2,337,256 | Lewis et al. | Dec. 21, 1943 |
| 2,344,244 | Freed et al. | Mar. 14, 1944 |
| 2,383,134 | Lacey et al. | Aug. 21, 1945 |

(Other references on following page)

FOREIGN PATENTS

| Number | Country | Date |
|--------|---------|------|
| 22,523 | Great Britain | A. D. 1913 |

OTHER REFERENCES

Beilstein-Handbuch Der Organischen Chemie, 4th edition (1933) vol. 16, pages 8 and 36—citing.

Mitscherlich-Annalen der Physik & Chemic, vol. 32, page 225.

Zinin-Journ. fur Praktische Chemie, vol. 36, pages 98, 100, 102 (1845).

Willegerodt, Ber. der Deut. Chem., vol. 14, page 2636 (1881).

Willegerodt, Ber. der Deut. Chem., vol. 15, page 1004 (1882).

Heumann, Ber. der Deut. Chem., vol. 5, page 914 (1872).

Opolonick, Journal Ind. & Eng. Chem., vol. 27, 1935, pages 1045-6.

"The Preparation of Azoxy Compounds," Synthetic Organic Chemicals, Published by Eastman Kodak Co., vol. VII, October 1933, No. 1, pages 1 & 2.

Cohn Arbeits Methoden for Organisch-Chemische Laboratorien, 5th revised ed., 1923, page 790.

Chemical Abstract, vol. 36, page 5791, 1942 citing Organic Synthesis-Bigelow et al., vol. 22, pages 28-29 (1942).

Synthetic Organic Chemicals, vol. VII, #1, Oct. 1933, Pub. Eastman Kodak, Rochester, N. Y.